United States Patent [19]

Grosch

[11] Patent Number: 4,558,272
[45] Date of Patent: Dec. 10, 1985

[54] CURRENT CHARACTERISTIC SHAPER

[75] Inventor: James T. Grosch, Budd Lake, N.J.

[73] Assignee: AT&T Bell Laboratories, Murray Hill, N.J.

[21] Appl. No.: 628,042

[22] Filed: Jul. 5, 1984

[51] Int. Cl.⁴ ............................................. G05F 3/20
[52] U.S. Cl. .................................... 323/315; 179/70; 330/288; 307/500; 328/142
[58] Field of Search ............... 179/16 AA, 18 FA, 70, 179/77, 170 D, 170 J; 307/228, 263, 270, 490, 500; 323/311, 312, 315, 317; 328/142, 150, 172; 330/288

[56] References Cited

U.S. PATENT DOCUMENTS

| | | | |
|---|---|---|---|
| 3,863,169 | 1/1975 | Knight | 330/288 |
| 4,323,797 | 4/1982 | Embree et al. | 307/490 |
| 4,458,201 | 7/1984 | Koen | 323/317 |

OTHER PUBLICATIONS

1982 IEEE International Solid-State Circuits Conference, "A Hybrid Integrated Trunk and Subscriber Line Interface," Paul C. Davis et al., pp. 204–205.
*Introduction to Operational Amplifier Theory and Applications,* McGraw-Hill Books, 1975, by J. V. Wait et al., pp. 171–187.

*Primary Examiner*—William H. Beha, Jr.
*Assistant Examiner*—Jeffrey Sterrett
*Attorney, Agent, or Firm*—Charles S. Phelan

[57] ABSTRACT

First and second transistor current sources of complementary conductivity types are connected in series with an output connection between them in the series connection. Input signals control the conduction level of one of the sources so that it diverts correspondingly variable amounts of current of the other source away from the output connection in accordance with a first linear characteristic. Additional transistor current source circuits are provided, and responsive to a predetermined level of the same input signals, for diverting substantially different amounts of current away from the output connection in accordance with a second linear characteristic of different slope from the first characteristic.

9 Claims, 2 Drawing Figures

CURRENT CHARACTERISTIC SHAPER

FIELD OF THE INVENTION

This invention relates to current characteristic shaping, or profiling, circuits; and it relates more particularly to such circuits for translating an input current in a predetermined dynamic range to an output current of piece-wise linear characteristic but in a similar range.

BACKGROUND OF THE INVENTION

A longstanding problem in telephone communication systems has been that of providing loop operating current to a subscriber telephone line circuit in an efficient manner while assuring proper operation of the loop with minimum drain on the central office battery. In a digital telephone subscriber loop system, the problem becomes one of minimizing the power dissipated at a signal processing terminal that is remote from a central office. An electronic line feed circuit at the remote terminal must be able to supply ample current for normal operation while a subscriber station is off hook. The amount required depends upon the length of the subscriber line circuit. A current profiling feedback circuit is often included in a line feed circuit to determine when and how the available current for the line must change to accommodate a particular line length. In a strategy which tries to keep power dissipation at the remote terminal constant, independently of loop length, the current profile reduces to a piece-wise linear function. Circuits known in the art for producing piece-wise linear current functions are usually relatively complex and require substantial silicon area if in integrated circuit form or substantial labor cost if in discrete component form.

One example of a technique for producing a piecewise linear current characteristic is found in a P. C. Davis et al. paper "A Hybrid Integrated Trunk and Subscriber Line Interface", 1982 *IEEE International Solid-State Circuits Conference,* pp. 204–205. There an operational amplifier is provided for cooperation with multiple feedback circuits for providing several different load-line options.

Another example is found in *Introduction to Operational Amplifier Theory And Applications* by J. V. Wait et al., McGraw-Hill Books, 1975, at pp. 171–187. Wait et al. describe several ways to implement a function so that it varies linearly between breakpoints. All of the implementations described are built up around operational amplifiers; and most are voltage, responsive circuits.

SUMMARY OF THE INVENTION

A piece-wise linear function is implemented in a current shaping circuit by combining a constant current and a current that is proportional to an input current to achieve a corresponding output current combination. A breakpoint in the slope of the output current characteristic is implemented by switching another input-current-responsive current component into or out of the output current combination in response to changes in the level of the input through a predetermined value.

BRIEF DESCRIPTION OF THE DRAWING

A more complete understanding of the invention and its various features, objects, and advantages can be obtained from a consideration of the following Detailed Description in connection with the appended claims and the attached drawings in which

DETAILED DESCRIPTION

Figure 1:
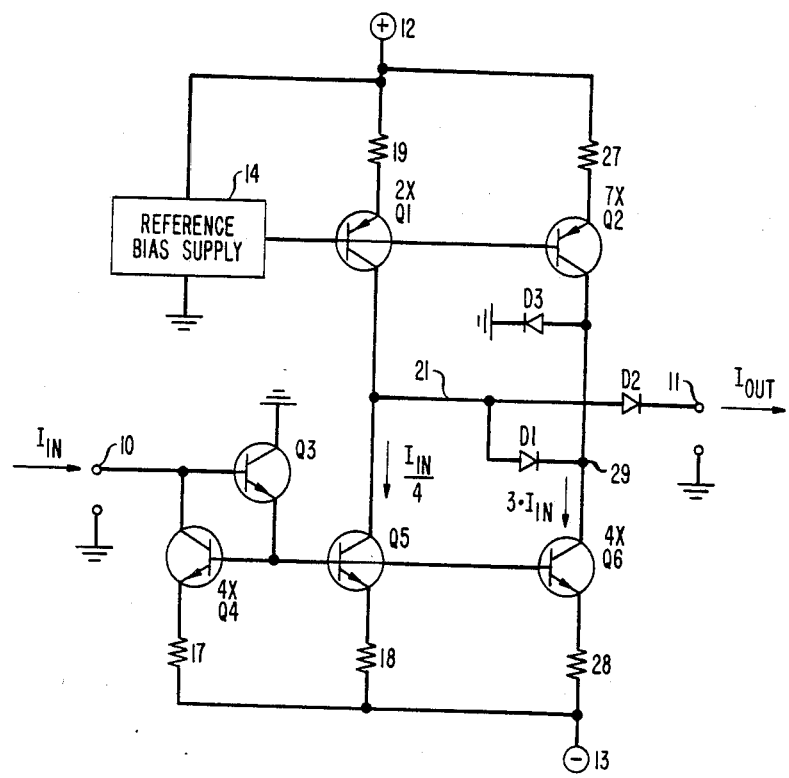
FIG. 1 is a schematic diagram of a current profiling circuit in accordance with the invention.

In FIG. 1 an embodiment of the current shaping circuit of the invention is applied to a current profiling application such as one might find in a direct current feedback circuit of an electronic line feed circuit. In such an application, an input signal current, which is a function of the voltage difference between tip and ring leads (not shown) of a subscriber line circuit in a telephone system, is received at an input terminal 10. Variations in that input current are translated by the illustrated circuit, in accordance with the current profile diagram of FIG. 2, to produce at an output terminal 11 a translated output current that is applied in a known manner to control the operating point of tip and ring amplifiers (not shown) of the electronic line feed circuit. Operation power for the circuit is illustratively provided from positive and negative voltage supplies 12 and 13, respectively, which are schematically represented as circled polarity signs to indicate supplies having their terminals of the indicated polarity connected at the symbol and having their opposite polarity terminals connected to ground. Signal input and output terminals are also referenced to ground.

Input signals at terminal 10 in FIG. 1 are applied to a current repeater circuit in the form of a current mirror amplifier (CMA) arranged in a manner known in the art for repeating currents in a proportioning manner which is relatively independent of a transistor current gain $\beta$. Thus, the input currents are applied to the collector terminal of an npn master transistor Q4. The base-emitter junction of another npn transistor Q3, which has its collector terminal connected to ground, is connected across the collector-base junction of the transistor Q4 to make the CMA less susceptible to low-$\beta$ induced errors. A resistor 17 connects the emitter terminal of transistor Q4 to supply 13. Transistors Q3 and Q4 are nonconducting in the absence of input signals at terminal 10. Current in transistor Q4, proportioned according to the predetermined CMA proportioning function, is mirrored into a slave npn transistor Q5 path. A resistor 18 connects the emitter of transistor Q5 to supply 13. The collector terminal of that transistor is connected through a current source connected pnp transistor Q1 and a resistor 19 to the positive supply 12.

Figure 2:
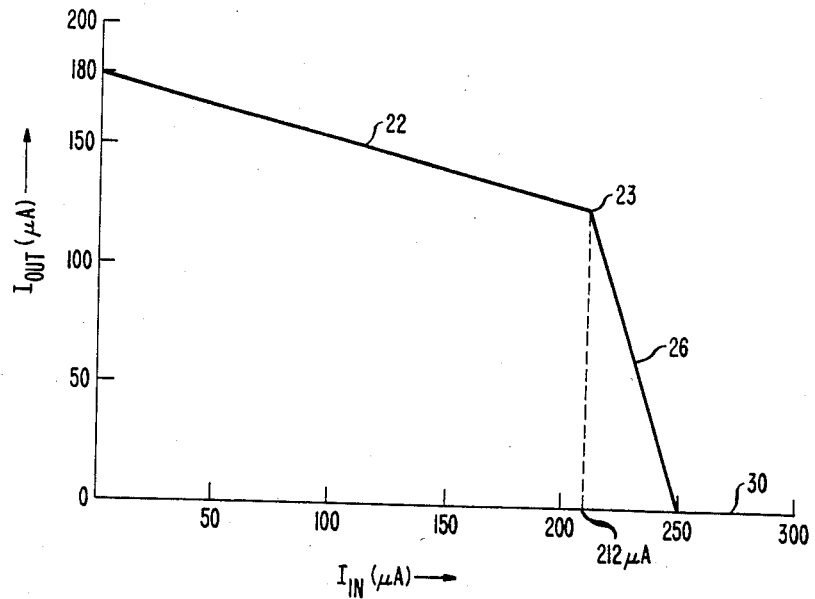
FIG. 2 a diagram of an illustrative piecewise linear current profile for the circuit of FIG. 1.

A reference bias supply 14 connected between supply 12 and ground biases transistor Q1 for conduction at a predetermined level appropriate to the application of the profiling circuit. Illustratively that level is 180 microamperes for zero input signal as shown in FIG. 2. At that condition, transistors Q4 and Q5 are nonconducting, and all output from transistor Q1 flows through a lead 21 and a diode D2 to the output terminal 11. As input signal at terminal 10 increases, transistors Q4 and Q5 of the CMA increase conduction correspondingly and thereby divert increasing amounts of current from lead 21 into transistor Q5. Current source transistors Q1 and Q5 thus cooperate in a source/sink style of operation.

Base-emitter junction areas of transistors Q4 and Q5 and resistances of resistors 17 and 18 are advantageously proportioned to realize a desired slope for the portion 22 of the current profile. In the illustrative application, that portion represents the subscriber off-hook portion when the loop is closed to conduct office battery current. Thus, the profile output currents corresponding to that portion 22 represent the levels of control to tip and ring amplifiers that may be needed to accommodate the range of subscriber loops to which the FIG. 1 circuit might be connected in practice.

It can be shown that at low values of input current, the transistor junction areas are the principal factors determining current proportioning, and above that level of conduction the circuit resistance is the principal factor. Since a slope of about 0.25 is desired for the illustrative profile portion 22, the junction area of transistor Q4 is made about four times that of transistor Q5; and the resistance of resistor 17 is made about 0.25 that of resistor 18. Otherwise, absolute values chosen for resistors 17 and 18 depend on designer convenience as long as sufficient resistance is employed for each to provide some significant degeneration at high signal levels so that the ratio between the resistors controls the current flow in transistor Q5. Also resistor 18 must not be so large that the voltage generated across resistor 18 at high current levels is so great that transistors Q1 and Q5 saturate.

Location of a breakpoint 23, or knee, in the characteristic of FIG. 2 depends upon the application in which the circuit of FIG. 1 is to be used. For example, in an electronic line feed circuit for a telephone subscriber loop, the minimum loop current supplied to the subscriber station when off-hook is determined, and the corresponding input current to the current profiling feedback path becomes the input current abscissa point to locate the breakpoint 23 on the line 22. In FIG. 2, that point is illustratively 212 microamperes; and it is the point beyond which profiling circuit output current changes much more rapidly in response to input current than was the case along the line 22.

The slope of the new characteristic portion 26 to the right of breakpoint 23, which portion governs on-hook operation, i.e., higher profile circuit input currents, is determined by a second branch of the circuit of FIG. 1 which is similar in configuration to the branch of transistors Q1 and Q5. Thus, a current source connected pnp transistor Q2 has its base terminal biased by the same output of reference bias supply 14 used for transistor Q1; and its emitter terminal is connected by a resistor 27 to the supply 12. Resistor 27 has a resistance value chosen, in conjunction with the desired slope of characteristic portion 26 and the bias available from supply 14, to fix the conduction for transistor Q2 for establishing the location of breakpoint 23 along line 22 of the illustrated characteristic. In the illustrative embodiment that current is about 3.5 times the current in transistor Q1. Otherwise, it is necessary only that resistors 19 and 27 have at least enough resistance to provide some degeneration so that the resistors control the amount of current flowing out of transistors Q1 and Q2.

An npn transistor Q6 is in a second slave branch of the CMA and has its base terminal connected to that of transistor Q4. Thus, transistor Q6 operates as an input signal controlled current source. The collector-emitter path of transistor Q6 is connected in series with a resistor 28 between the collector of transistor Q2 and the supply 13. A diode D3 is connected to the collector of transistor Q2 to sink its current to ground when current in transistor Q6 is insufficient to sink the transistor Q2 current. This prevents Q2 from saturation. Base-emitter junction area of transistor Q6 is the same as that of transistor Q4. Resistor 28 has a resistance about one-third that of resistor 17 so that transistor Q6 conducts an amount of current approximately equal to three times the input current flowing in transistor Q4.

The series combination of transistors Q2 and Q6 has a terminal 29 in circuit between their respective collectors. That terminal is connected to pull current from lead 21 by way of a diode D1 at the precise point at which the current pulled by transistor Q6 exceeds the current supplied by transistor Q2. When diode D1 conducts, the current diverted from lead 21 does not reach output terminal 11, and so the output current falls in exact correspondence to the combined effects of operation of transistors Q5 and Q6, thereby producing the characteristic portion 26 of FIG. 2.

Note that diode D2 in lead 21 prevents the output current from becoming negative, so the horizontal portion 30 of the FIG. 2 characteristic results for input currents larger than the minimum which produces zero output current. If diode D2 were connected with a polarity the reverse of that illustrated, only negative output currents would be produced. In the latter case, a current sinking diode, like diode D3, must be added at the collector of transistor Q1 to sink current at low input current levels when transistor Q5 draws less than the full output of transistor Q1, thus preventing Q1 from saturating.

A current shaping characteristic with a portion having a positive slope (as compared to the illustrated negative slopes) can be realized by interchanging the positions in the breakpoint stage of transistors Q2 and Q6, of the fixed and variable current sources with respect to the supply rails and by reversing the polarity of the diode that implements the breakpoint. For example, transistor Q2 is replaced by a current mirror to invert the collector current of transistor Q6 and supply it to a new fixed current source npn transistor biased from a second reference bias supply similar to supply 14, but biased between ground and supply 13.

Similarly, a current characteristic shaping circuit having multiple breakpoints can be realized by utilizing a corresponding number of breakpoint stages of one or more of the foregoing types, with respective breakpoint diodes connected to the lead 21.

Although the present invention has been described in connection with particular embodiments thereof, it is to be understood that additional embodiments, applications, and modifications which will be apparent to those skilled in the art are included within the spirit and scope of the invention.

What is claimed is:

1. A current characteristic shaping circuit comprising
means for combining a fixed current and a first input-signal-variable current to produce a corresponding output current, and
means, responsive to a predetermined level of said output current, for switching a second input-signal-variable current into or out of said output current depending upon the direction of output current transition through said predetermined level.

2. The current characteristic shaping circuit in accordance with claim 1 in which
means are provided for separately repeating shaping circuit input signals in predetermined different proportions to produce said first and second input-signal-variable currents, respectively.

3. The current characteristic shaping circuit in accordance with claim 2 in which
said repeating means comprises a current mirror amplifier having a master branch responsive to said input signals and first and second slave branches producing said first and second input-signal-variable currents, respectively.

4. The current characteristic shaping circuit in accordance with claim 1 in which
said combining means comprises
first and second current sources connected in series for cooperative source/sink operation,
an output connection from a circuit point between said sources in the series connection thereof,
means for fixedly biasing said first current source to establish a predetermined level of current in said output connection, and
means, responsive to shaping circuit input signals, for variably biasing said second current source to modify the level of current in said output connection in accordance with a predetermined output current versus input current characteristic slope in a first predetermined range of said input signals, and
said switching means comprises means, responsive to said input signals in at least a second input signal range, for further variably modifying the level of output current in said output circuit to achieve a characteristic of a different predetermined slope.

5. The characteristic shaping circuit in accordance with claim 4 in which said further modifying means comprises
third and fourth current sources connected in series for cooperative source/sink operation,
means for connecting said third current source to be fixedly biased by said fixedly biasing means,
means for connecting said fourth current source to be variably biased by said variably biasing means,
a circuit terminal between said third and fourth current sources in the series connection thereof, and
unidirectional conducting means connected between said output connection and said circuit terminal and poled for forward conduction of current during said further variable modifying of the level of output current in said output circuit.

6. The current characteristic shaping circuit in accordance with claim 5 in which said further modifying means further comprises
means for sinking current from said third current source during operation in at least said first predetermined range of said input signals.

7. The current characteristic shaping circuit in accordance with claim 5 in which said further modifying means comprises
means for proportioning current in said second and fourth current sources to establish said slopes in said first and second ranges, respectively.

8. The current characteristic shaping circuit in accordance with claim 7 in which said proportioning means comprises
a current mirror amplifier for mirroring shaping circuit input signals to control operating current levels of said second and fourth current sources, and
resistive means in said amplifier for proportioning current in said second and fourth current sources in at least said second range.

9. The current characteristic shaping circuit in accordance with claim 8 in which
said second and fourth current sources comprise transistors having their internal collector-emitter paths connected in the respective series connections of such sources, and
base-emitter junction areas of said transistors of said second and fourth current sources are proportioned for proportioning current in such sources in at least a part of said first range.

* * * * *